United States Patent
Crawford

(10) Patent No.: US 10,369,927 B2
(45) Date of Patent: Aug. 6, 2019

(54) SOL: A SYSTEM FOR CHILD SAFETY ALERT

(71) Applicant: Tamika Crawford, McDonough, GA (US)

(72) Inventor: Tamika Crawford, McDonough, GA (US)

( * ) Notice: Subject to any disclaimer, the term of this patent is extended or adjusted under 35 U.S.C. 154(b) by 0 days.

(21) Appl. No.: 15/803,806

(22) Filed: Nov. 5, 2017

(65) Prior Publication Data
US 2019/0135175 A1    May 9, 2019

(51) Int. Cl.
| | | |
|---|---|---|
| *B60Q 9/00* | (2006.01) | |
| *B60Q 1/00* | (2006.01) | |
| *G08B 21/02* | (2006.01) | |
| *B60N 2/00* | (2006.01) | |
| *G01K 13/00* | (2006.01) | |
| *G01L 5/00* | (2006.01) | |
| *G08B 21/18* | (2006.01) | |
| *G01K 1/02* | (2006.01) | |
| *H04W 4/80* | (2018.01) | |

(52) U.S. Cl.
CPC ............... *B60Q 9/00* (2013.01); *B60N 2/002* (2013.01); *G01K 1/024* (2013.01); *G01K 13/00* (2013.01); *G01L 5/00* (2013.01); *G08B 21/182* (2013.01); *G08B 21/02* (2013.01); *H04W 4/80* (2018.02)

(58) Field of Classification Search
CPC .. B60Q 9/00; B60Q 1/00; H04L 29/06; H04L 12/28; G08B 21/02; G08B 19/00; G06M 7/00; H04W 4/22; G08G 1/052; A61B 5/00
See application file for complete search history.

(56) References Cited

U.S. PATENT DOCUMENTS

| | | | | |
|---|---|---|---|---|
| 4,641,127 A | * | 2/1987 | Hogan | G08B 19/00 340/521 |
| 6,163,277 A | * | 12/2000 | Gehlot | G08G 1/052 340/539.1 |
| 9,741,224 B1 | * | 8/2017 | Singh | H04W 4/14 |
| 10,102,729 B1 | * | 10/2018 | Hill | G08B 21/24 |
| 2006/0208169 A1 | * | 9/2006 | Breed | B60N 2/002 250/221 |
| 2011/0092779 A1 | * | 4/2011 | Chang | A61B 5/00 600/301 |
| 2013/0021154 A1 | * | 1/2013 | Solomon | G08B 21/0453 340/539.12 |
| 2013/0109342 A1 | * | 5/2013 | Welch | B60N 2/002 455/404.2 |
| 2015/0087259 A1 | * | 3/2015 | Hinsen | H04W 4/90 455/404.2 |
| 2015/0264017 A1 | * | 9/2015 | Saed | H04L 63/045 380/270 |
| 2016/0261425 A1 | * | 9/2016 | Horton | G05B 15/02 |

* cited by examiner

*Primary Examiner* — Yuri Kan
(74) *Attorney, Agent, or Firm* — Rondal D. Baker, Esq.; Baker & Company, LLC.; Gustavo Marin

(57) ABSTRACT

The present invention is a method and system of determining and collecting data such as, location, weather, temperature, and time to users of a mobile devices. Mobile devices such as smart phones, tablets, internet computers, and other hand held mobile devices may be ideal for tracking harmful environmental conditions. The affiliations are determined based upon location of mobile devices as tracked by Internet services and activation of the system by the user. The system may even be enhanced by use of features tailored by the user.

1 Claim, 4 Drawing Sheets

SOL: A SYSTEM FOR CHILD SAFETY ALERT

FIELD OF INVENTION

The subject disclosure relates to a system for alerting users to dangerous conditions. More particularly, the present disclosure relates to a system and method of communicating vehicle environmental conditions to users by using a mobile device.

BACKGROUND

Today there are an increased number of children dying of heat strokes as a result of being left in vehicles. Despite being warned through media and or local law enforcement, young children are still being left in hot vehicles at an astounding rate. In 2013 there were at least 44 cases where children have died due to heat strokes in the United States. Civic leaders have grappled at how to address this concern to no avail. Until now there have been little use of technology to help prevent these deaths. Traditionally advancements in mobile devices has supported the corporate sector as well as personal needs and has not focused much on emergency purposes. Entertainment has increasingly been a huge part of mobile device use due to gaining and the ability for users to connect over the internet for purposes of competition. The only relevant use related to emergency as it relates to mobile devices has been to alert the public to events such as inclement weather or abducted children.

Mobile devices, such as tablets, iPads, internet capable watches, and other handheld mobile devices, provide functionality and access to technology to users as they move about in their daily lives by providing information about sports, news, or retail products. Consumers depend heavily upon smart phones and other mobile devices to keep track of personal data, communicate with colleagues, and shopping. Traditionally, young adults have primarily used mobile devices for texting, downloading apps for entertainment, and locating the hottest spot for socializing. It is no secret that since the introduction of mobile devices the growing trend has leaned toward networking and entertainment. Other trends have been toward business professionals who use mobile devices for keeping track of changes in business news. For instance, the iPad® has been fairly popular in the business arena for older and more successful users due its ability to employ various apps that are useful for tracking business news and keeping up with cutting edge technology.

BRIEF SUMMARY

The proposed invention will serve to help to prevent child deaths as a result of being left in a vehicle. There has been a staggering increase in the number of children dying in hot unattended vehicles. Despite efforts to educate and warn the public about this serious concern the number of deaths has skyrocketed. The current invention incorporates vehicle surveillance that have not been previously utilized to prevent child deaths. The Sol system is configured to perform safety surveillance for a user by monitoring the environmental state of a vehicle's interior compartment. By utilizing data attributable to a vehicle, the Sol system will help save lives by placing critical information at the fingertips of mobile device users everywhere.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
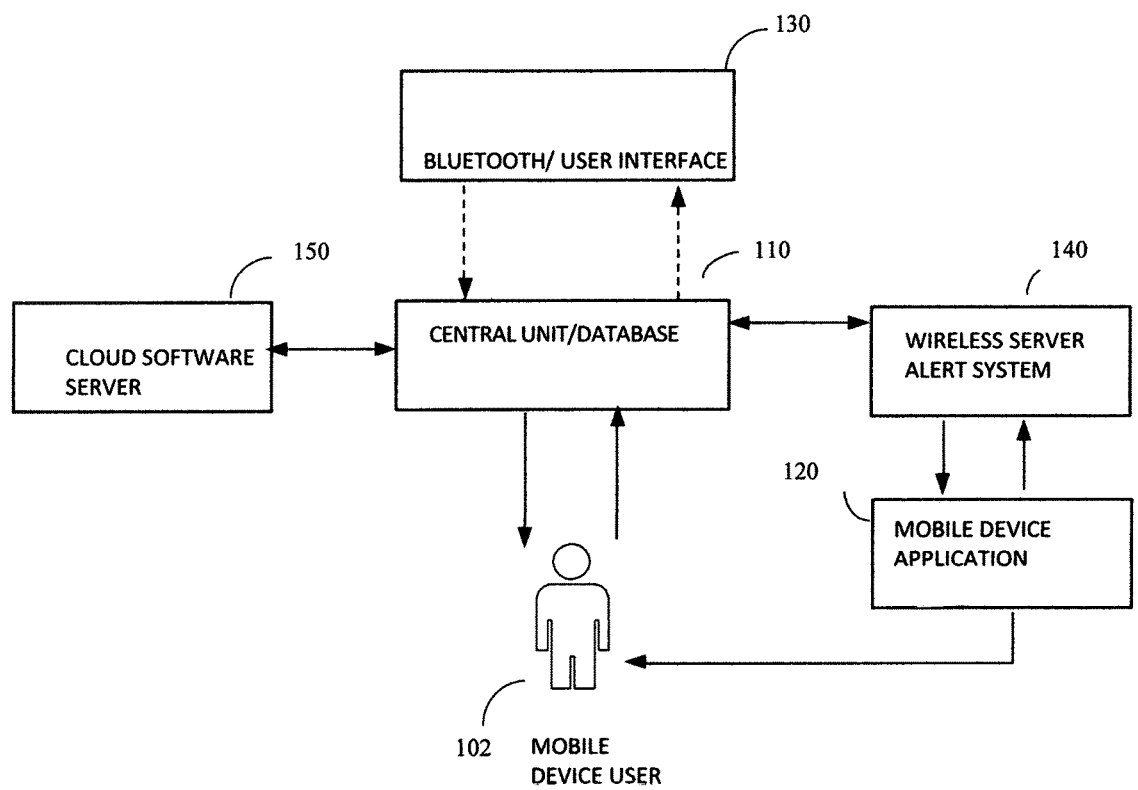
FIG. 1 is a system diagram for an exemplary system configuration consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a mobile device refers to a variety of components that operates using any means of internet connection or similar modem that transmits packets of data that allow smart devices (such as phones, tablets, computers, handheld devices, game devices, etc.) to be updated when they receive data regarding the interior condition of a vehicle. The ability of a mobile device to collect such data packets based on the vehicle's interior environment is important when compiling critical information in order to relay to the user.

Reference throughout this document to a sensor refers to a variety of components that operates using any means of technology to detect the presence of an object. The term object may incorporate any obstruction or sizeable matter and is not limited to humans or animals. The ability of a sensor to detect such object is important to relay critical information to the user.

In an embodiment, the Sol application utilizes a Bluetooth technology or similar technology that is connected to a mobile device such as computer, Android tablet, or iPhone etc. but is not limited to these examples. The Sol application may be adaptable to a variety of Bluetooth devices that can be mounted in modern or older vehicles. The Bluetooth technology can be derived from devices such as radios or any medium useful for vehicles. Additionally, hardware can be mounted to seats or any surface of the interior of the vehicle to indicate the presence of an occupant and communicate data directly to the mobile device via the Bluetooth device. Once connected to the mobile device, the Bluetooth device is in constant contact with both the hardware and the mobile device at all-times and will continuously transmit data; in a non-limiting example, users may initiate additional functions by manually alerting the software system installed on the mobile device. Connecting with the software application stored on an iPhone, Android tablet, or computer is a reliable method to ensure that all collected data associated to the vehicle are stored and accessible for a user. Once the system is initiated the user will be alerted via mobile device and all of the data in an instance will be monitored for life threatening conditions. The data maybe saved to a digital storage in a cloud-based service such as Amazon web service as an example. Any mobile device that the user decides to configure will have the capability to collect and analyze a vehicle's conditions while the user is away from the vehicle either by accident or for other purposes that will make such information useful in the user's absence. In a non-limiting example, the application installed on the mobile device may display an image of a user's family member to indicate who may be in peril. Information is constantly compiled for each device through use of the software application on the desired mobile device.

Utilizing such data as location information and temperature, Sol system provides highly accurate data for mobile device users to avoid a potential dangerous event. In a non-limiting example, a mobile device will collect critical data from a sensor which may simultaneously analyze conditions to estimate the likelihood of harm. The more data collected from the vehicle's conditions the more confident the mobile device can quickly determine the probability of life-threatening events. Refining the predictability of a mobile device may require additional data points in order to increase accuracy.

In an exemplary embodiment, the use of mobile devices to predict and be alerted to dangerous conditions for pets, children, or other susceptible persons to conditions such as heat. This will present an opportunity for a user to quickly respond to such circumstances by using a combination of mobile device, sensors, and application software systems. The confluence of time, location, and temperature attributable to a known vehicle location by a user is a critical set of information that may be captured through the use of both a mobile device and a software system that stores critical data for the user. The event of extreme changes in temperatures that may occur in a vehicle can quickly be communicated to the user. Once the temperature reaches a certain threshold point the software system records the data associated to the temperature etc. and the user is notified.

In an exemplary embodiment, the characteristics of the mobile device and other user information associated with the mobile device may be input manually by the user. The key factors of tracking and retrieving data manually will be left solely up to the user's preference. In a non-limiting example, the Sol system may also automatically track sounds that can be transmitted directly to the mobile device for the user. This method of collecting data involves the use of monitoring the vehicle's interior conditions by use of microphones in order to assist the software system to perform accurate predictions and or keep an accurate record for emergency purposes. Furthermore, in a non-limiting example weather data may be captured in future iterations of the current invention to include; barometric pressure, tide data for ocean locations, and air flow rate.

In an exemplary embodiment, Sol application server may utilize the information derived from the vehicle where the temperature variance is significantly dissimilar from normal temperature variances for a given time period. The present invention may provide a method of transmitting data to emergency officials such as 911 serves and police. The user may also edit a variety of information (e.g., time, identification of vehicle, and locations). In a non-limiting example, the location feature allows users to share the specific location of the vehicle to emergency officials by sharing a map and name of locations for responders. The system then can provide a report to show time and date of events for purposes such as court appearances, medical purposes, or insurance information where such information is critical.

In an exemplary embodiment, the Sol system will also detect the location of an object within an automobile and immediately communicate to the user's mobile device after the vehicle's engine has been turned off or no movement has been detected in the driver's seat for 5 minutes. The user can program the Sol system to contact 1 or more parties upon activation and will automatically contact 911 after 10 minutes. Additionally, the Sol system will automatically send an audible alert to the mobile device no matter if the mobile device is in silent mode. Furthermore, the Sol system allows for a manual override in the event there is no object in the vehicle. The Sol system also includes application software to be downloaded to the user's mobile device.

Turning now to FIG. 1, this figure presents a system diagram for an exemplary system configuration consistent with certain embodiments of the present invention. A system for communicating data to a user's mobile device 100. A mobile device may be carried or worn by the user while in a remote location away from the vehicle where information may be transmitted to a cloud-based server 114 for use by a mobile application 120. A user may initiate the software system by utilizing the mobile device application 120. When the system is initiated, the central unit sends information data collected through Bluetooth technology, containing vehicle conditions to the wireless server alert system 140 which transmits data to the mobile application software 120. The application software server 120 stores the transmitted information data in a database 110 containing all of the collected data from the central unit, either automatically by the Sol system. The transmitted information may be stored through one or more cloud servers 114.

Figure 2:
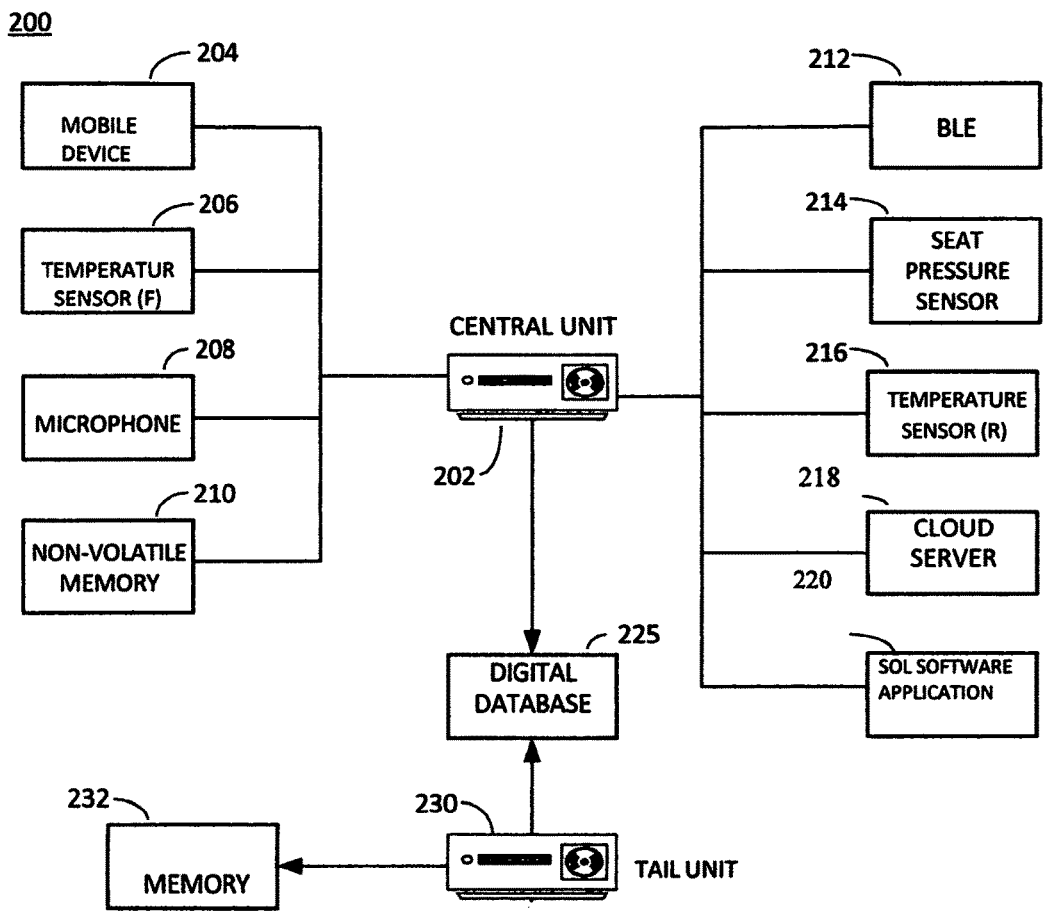
FIG. 2 is a system diagram for uploading data onto a mobile device consistent with certain embodiments of the present invention.

Turning to FIG. 2, this figure presents a system diagram for an exemplary system configuration consistent with certain embodiments of the present invention. More specifically, this figure presents an operable diagram for how various components of the Sol system are configured. The central unit 202 is a component of the Sol system which receives and processes data. A (BLE) 212 is a Bluetooth Low Energy device intended to provide wireless communication. At 230 the tail unit is a beacon device for a Bluetooth Low Energy device 212. The collected data is stored in a memory cache 232 and is maintained by a cloud server 218. The non-volatile memory 210 is a computer memory that can retrieve stored information even after experiencing a power loss. The front (F) 206 and rear (R) 216 temperature sensors are operable to sense ambient temperature within the vehicle. The microphone 208 is operable to record sound that originates from the vehicle's compartment. The seat pressure sensor 214 is operable to detect the presence of an occupant in the seat The Sol application software 220 is installed on the user's mobile device 204 to allow operation by an intended user. The system data may be stored in a cloud server 218.

Figure 3:
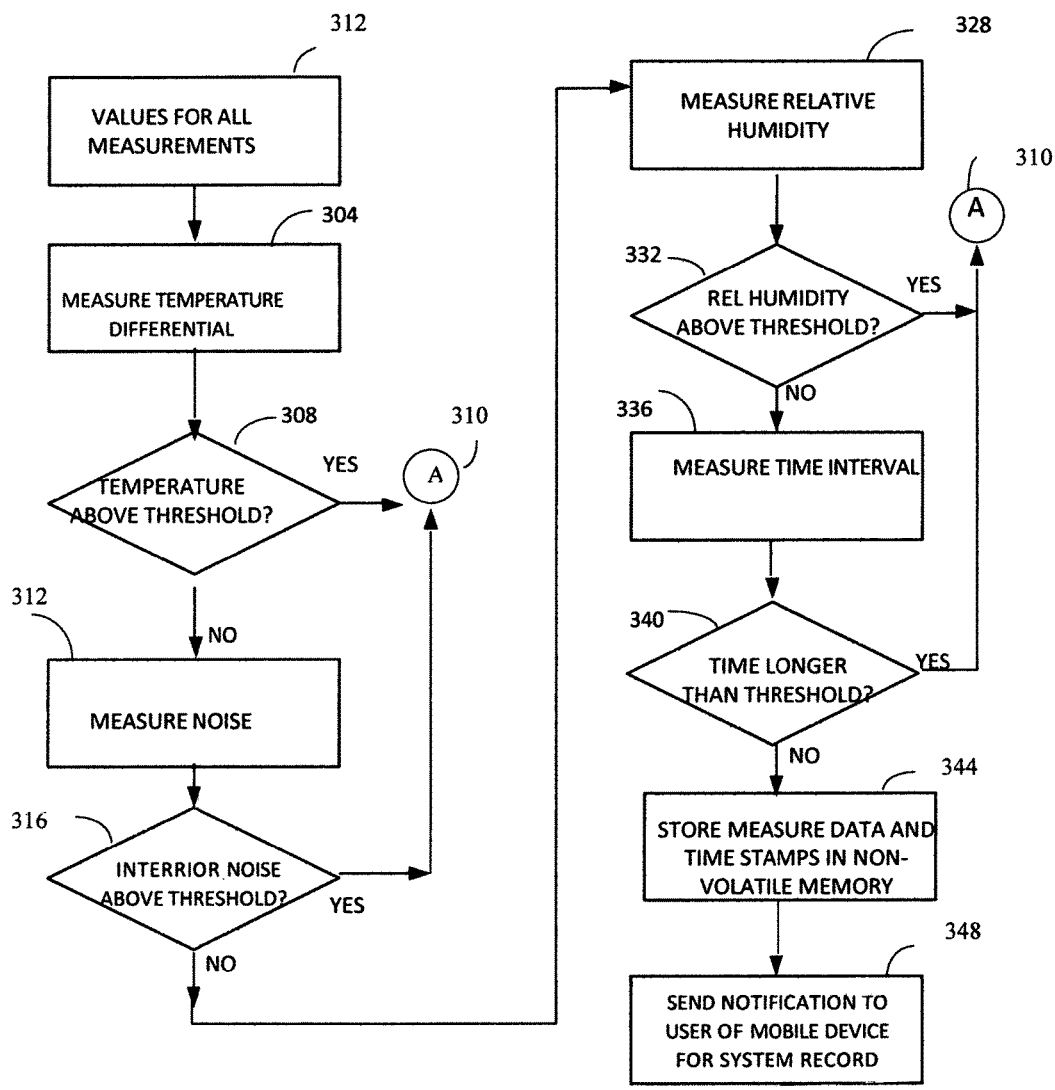
FIG. 3 is a process flow for the determination of critical data for the owner or user of a mobile device consistent with certain embodiments of the present invention.

Turning to FIG. 3, this figure presents a process flow for the determination of certain affiliations of the user of a mobile device consistent with certain embodiments of the present invention. When a mobile device is initiated by the Sol software system at 300, the application on the mobile device will send collected data to a mobile device application. In a non-limiting example, the Sol software system application stored on the mobile device will keep track of all captured data.

At 302, the Sol System will submit data to a configured mobile device for purposes of calculating the probability of certain characteristics for purposes of determining certain affiliations. At 348, as an example, the system can also submit data to a digital storage in a cloud-based service such as Facebook, LinkedIn, Amazon, and other such mobile service providers, may receive data regarding collected data.

At 304, the Sol software system has the capacity to analyze such data by utilizing all of the collected data from the central unit for measuring the temperature differential. The application may also use algorithms known in the art to continually improve upon and optimize the output of data. As a non-limiting example assume a mobile device is activated and is properly operating for purposes of determining certain attributes of the vehicle. Where data has been previously collected, the software system may be used to determine the probability of a user's chances of preventing a harmful event but the system may constantly calculate additional attributes for the user based on algorithms used in the software. To illustrate, where a user was successfully prevented previous dangers associated to temperature by using the Sol system the application software system will continue to perform calculations that utilizes data at each incident to ensure that the user improves his odds at each subsequent interaction within a given period of time.

At 308, the Sol system will alert the system of whether or not harmful conditions exist for the vehicle's occupants which triggers the application software system described above to perform calculation based on the triggering event and if the temperature is above the threshold the system will alert the user and emergency agencies at 310.

If the temperature has not reached the critical threshold at 308 then the Sol system will measure noise levels in the vehicle's interior at 312. If the noise is above the critical threshold at 316 then the system will alert the user and emergency agencies at 310. If the noise level has not reached a critical threshold then the Sol system will measure the relative humidity at 328.

At 332, if the relative humidity has reached the critical threshold then the Sol system will alert the user and emergency agencies at 310. If the relative humidity has not reached a critical level then the Sol system will measure the time interval at 336.

At 340, the Sol system may also alert the user based on a designated time interval to further ensure that the user is not only receiving critical temperature data but also lifesaving data independent of temperature. If the time interval has reached the designated threshold then the system will alert the user and emergency agencies. The Sol system may be alerted if the driver's seat has been unoccupied for at least 5 minutes.

At 344, the Sol system will store calculated data and time stamp in a non-volatile memory.

At 348, upon a user's request the Sol system offers alternative means of alerting the end user by offering various options for responders that allows for simultaneous audible and visual alerts on the mobile device.

Figure 4:
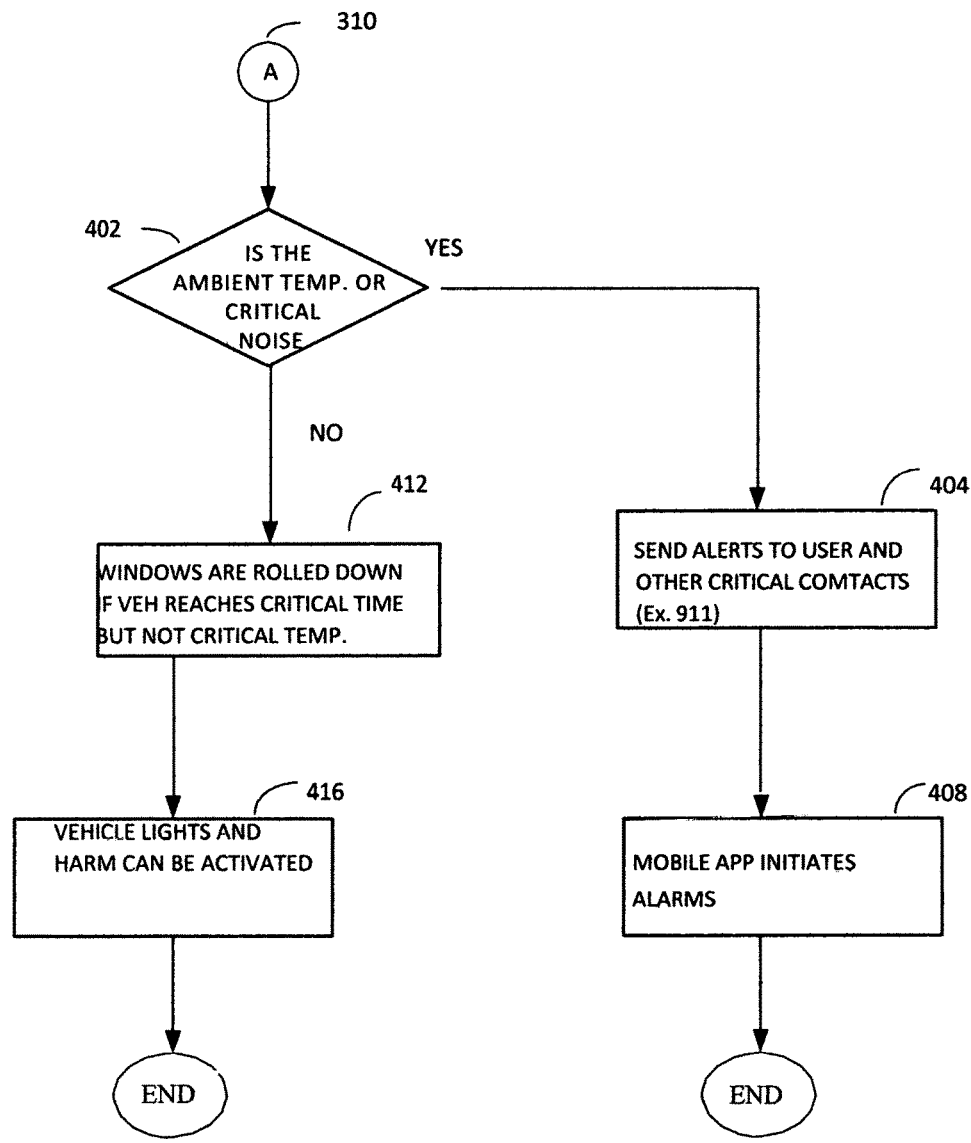
FIG. 4 is a process flow for the determination of critical data for the owner or user of a mobile device consistent with certain embodiments of the present invention.

Turning to FIG. 4, this figure presents a process flow for the determination of certain affiliations of the user of a mobile device consistent with certain embodiments of the present invention 400.

At 402, when a mobile device is contacted by the Sol system application the central unit will send collected data associated to temperature and noise to the mobile device application. In a non-limiting example, the Sol software system application stored on the mobile device will keep track of all captured data. If the data is determined to be above the critical threshold then the Sol system will send and alert to the user and other critical contacts for the purpose of rendering aid to the occupant of the vehicle.

At 408, the mobile device application will initiate various alarms to make the user aware of dangerous conditions.

At 412, if the system determines that the temperature threshold has not been reached but time interval has been achieved then the Sol system will roll down the windows if an occupant has been detected via seat pressure sensors.

At 416, in an alternative embodiment the vehicle's lights and harms can be activated to alert others that assistance is needed.

While certain illustrative embodiments have been described, it is evident that many alternatives, modifications, permutations and variations will become apparent to those skilled in the art in-light of the foregoing description.

What is claimed is:

1. A system for alerting a mobile device user when dangerous conditions threaten one or more occupants of a vehicle comprising:

a safety surveillance computer comprising a processor and software, the software when executed by the processor causes the processor to:

connect to a communication system;

operate at least one window of the vehicle;

receive data from one or more seat pressure sensors, the one or more seat pressure sensors operable to determine presence of, and detect movement of, the one or more occupants;

keep an audio recording from one or more microphones for keeping an audio record;

receive data from one or more temperature sensors, the temperature sensors operable to sense extreme changes in temperature;

wherein if an extreme change in temperature is received, by a central unit, from the at least one temperature sensor, the safety surveillance computer communicates to a first communication device, via the communication system, after the vehicle has been turned off or no movement has been detected by the seat pressure sensors, for five minutes;

if no response is received, from the first communication device, after ten minutes, the safety surveillance computer:

communicates, via the communication system, to a second communication device;

and operates the at least one window of the vehicle.

* * * * *